United States Patent

[11] 3,593,285

| [72] | Inventor | Hanno Gillmann<br>Konstanz, Germany |
|---|---|---|
| [21] | Appl. No. | 749,048 |
| [22] | Filed | July 31, 1968 |
| [45] | Patented | July 13, 1971 |
| [73] | Assignee | Telefunken Patentverwertungsgesellschaft m.b.H.<br>Ulm Danube, Germany |
| [32] | Priority | Aug. 1, 1967 |
| [33] | | Germany |
| [31] | | P 16 23 855.4 |

[54] MAXIMUM SIGNAL DETERMINING CIRCUIT
11 Claims, 5 Drawing Figs.

[52] U.S. Cl. ............................................. 340/146.3, 307/235, 328/116
[51] Int. Cl. ............................................. G06k 9/02, H03k 5/20
[50] Field of Search ............................................. 340/146.3; 307/235, 236; 328/104, 115, 116, 118, 137, 154

[56] References Cited
UNITED STATES PATENTS

| 2,974,286 | 3/1961 | Meyer | 328/116 |
| 3,092,732 | 6/1963 | Milford | 307/235 |
| 3,104,369 | 9/1963 | Rabinow et al. | 340/146.3 |
| 3,166,679 | 1/1965 | Paufve | 307/235 |

*Primary Examiner*—Maynard R. Wilbur
*Assistant Examiner*—Leo H. Boudreau
*Attorney*—Spencer & Kaye

ABSTRACT: A circuit arrangement for determining which of a plurality of signal-carrying conductors contains the highest-amplitude signal, the circuit including a plurality of amplifiers each having an input connected to a respective line and feedback circuitry connected between the amplifier outputs and their inputs for producing, at a common point, a signal representing the output of that amplifier connected to the line containing the highest-amplitude signal and for causing each of the remaining amplifiers to produce an output which is approximately equal to the difference between its associated input signal and the highest input signal.

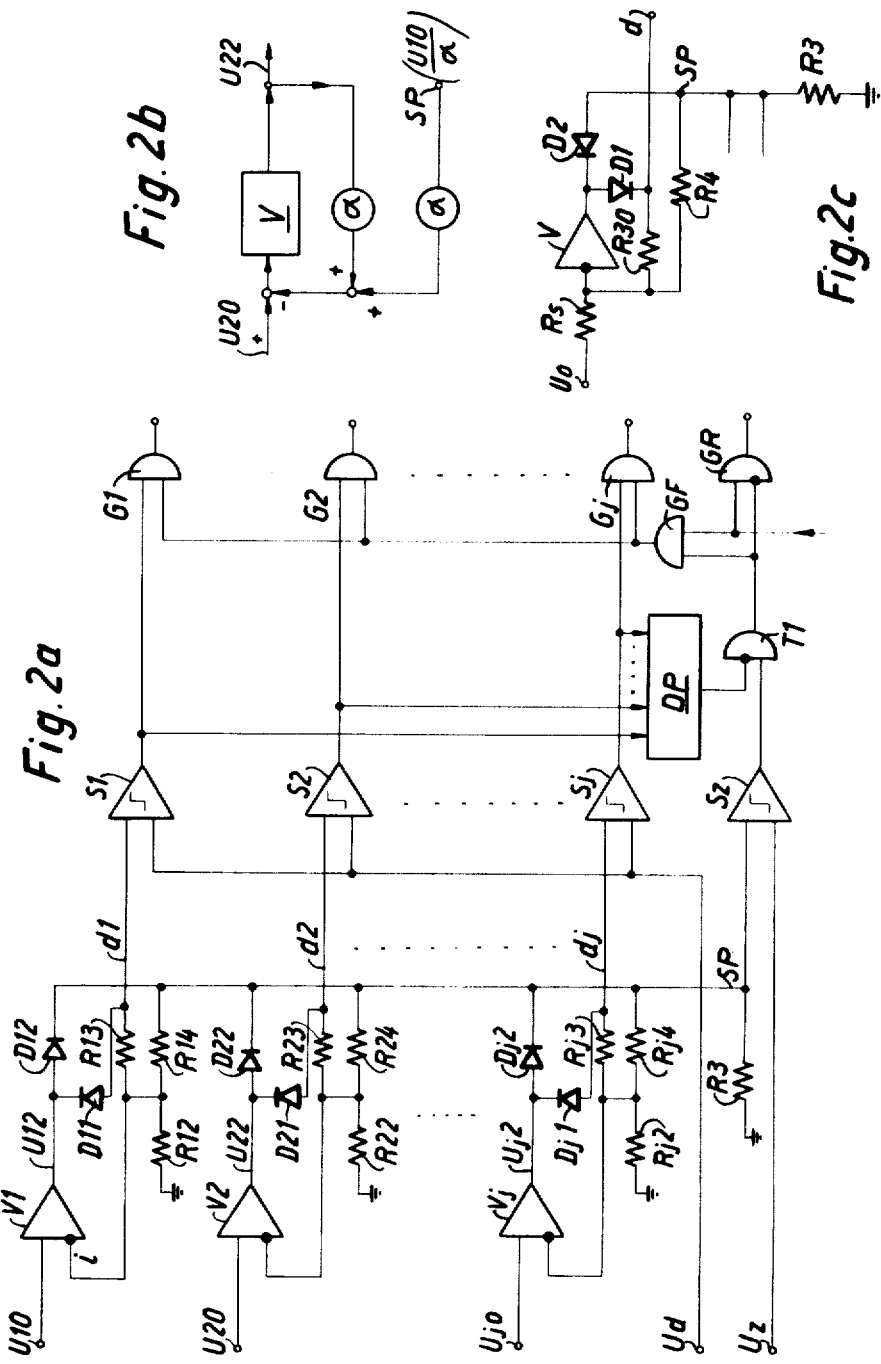

MAXIMUM SIGNAL DETERMINING CIRCUIT

BACKGROUND OF THE INVENTION

The present invention relates to circuits for determining which line or lines of a series of output lines carries the highest or lowest voltage signal.

This requirement exists, for example, in the evaluation of cross-correlation functions when the identification of an available voltage signal shape occurs in a correlation system. One circuit arrangement known in the mechanical character recognition art is based on the fact that a particular character moving past a scanning converter produces voltages therein having particular characteristic voltage signal shapes. If such a voltage train is fed during a time which corresponds to the time required to convey the character through the converter, into a delay line provided with outputs for measuring the voltage state at particular points, samples of the waveform of the received voltage, as a function of time, can be taken simultaneously from the different outputs and fed into correlation systems.

The correlation system associated with a particular character produces a maximum voltage when the waveform of this character appears in the delay line. However, a partial, less perfect, coincidence is also produced by correlation systems for other characters so that the output lines associated therewith also contain voltage signals. To determine that predetermined character with which the scanned character has the greatest similarity, it is necessary to determine which output line carries the highest (or lowest) voltage.

To assure that the scanned character and its associated predetermined, or nominal, character are sufficiently different from all other nominal characters, i.e. that the comparison will positively produce the best coincidence of one nominal character above all other nominal characters with the scanned character, it is further necessary to compare the highest voltage occurring in one of the output lines with all other voltages and to assure that a minimum difference is maintained.

U.S. Pat. No. 3,092,732, issued on June 4, 1963, to R. E. Milford, discloses a transistor circuit designed to determine the relatively highest signal voltage from a group of simultaneously arriving signals, which circuit is capable of making the above-described determination. In this circuit each of the voltage-carrying lines is connected to the base of an associated transistor. The emitters of these transistors are connected to a common resistor to produce a bias potential so that an increase in the collector current of the transistor receiving the highest input signal blocks the remaining transistors, which receive lesser input signals, due to the resulting increase in the bias voltage.

According to a further improvement presented by the circuit of this patent, a separate resistor is connected between the emitter of each transistor and the common resistor. As a result, when the ratio of the highest voltage occurring in one of the lines to, e.g., the next highest voltage falls below a certain predetermined value, not only the transistor having the highest input signal but also the transistor having the second-highest input signal emits an output signal. The occurrence of a plurality of output signals means that the scanned character can not be associated with sufficient accuracy with a certain nominal character and that a reject signal must be initiated.

SUMMARY OF THE INVENTION

It is a primary object of the present invention to overcome these drawbacks and difficulties.

Another object of the invention is to improve the accuracy with which the maximum signal is detected.

Yet another object of the invention is to assure that the maximum signal differs sufficiently from all of the other signals.

A further object of the invention is to verify that the maximum signal represents a sufficiently close coincidence between the detected character and a stored character.

Another object of the present invention is to permit the desirable possibility of producing changes in the above-mentioned minimum difference between the highest and the second-highest signal voltage during operation. Such a capability would be of value, for example, when, on the one hand, figures are to be read which require a high evaluation accuracy and, on the other hand, figures or letters which, in order to obtain a lower rejection rate, are allowed to be evaluated with less reading accuracy.

Opportunities for application arise, for example, in the mechanical reading of vouchers, checks or account cards. Here the amounts which are to be entered on accounts or to be otherwise evaluated must be decoded with great accuracy whereas other numerical data, as for example the data of the transaction, the identification number of the bank or other portions of the text, require less reading accuracy. It is moreover desirable to not place too great a demand on the mechanical reading of such data since otherwise the rejection rate would increase. Rejections result in relatively high expenditures which can be reduced, provided it is possible to easily discover errors in a subsequent processing operation.

These considerations show that it is advisable to change the reading accuracy during the reading of an item by a special control process so that the figures on the voucher which are in the space of the amount are read with great accuracy, while the figures in the other spaces, or letters, are read with lesser accuracy.

A further application of the controllable circuit according to the present invention results from the differentiation between bookkeeping and sorting tasks performed with the aid of a reading machine. Whereas in sorting processes, when the vouchers are to be sorted and compiled, for example, in sequential order of account numbers or bank numbers, an erroneous sorting, even if it is not discovered in a subsequent processing stage, does not do too much damage, the bookkeeping operation must be performed with great accuracy since undiscovered booking errors are damaging in any case.

These and other objects according to the invention are achieved, in a system including a plurality of conductors each carrying a respective signal, by a circuit for providing an indication of which conductor is presently carrying that signal whose amplitude is the highest of all the signals. The circuit according to the invention essentially includes a plurality of amplifiers, one for each conductor, each having an input connected to a respective conductor, maximum signal value receiving means connected to the outputs of all of the amplifiers and having a common output at which appears a signal corresponding to the highest of the output signals of all of the amplifiers, feedback means connected between the common output and each amplifier for applying to each amplifier an inverted input whose amplitude is a predetermined fraction of the common output signal, and a plurality of second feedback means each including a switching element and each connected between the output and the input of a respective amplifier. Each switching element is operative for feeding a predetermined fraction of its amplifier output back to its input only when the output from its respective amplifier is less than the maximum of all the amplifier outputs so as to cause the output from each such amplifier to produce an output signal which is approximately equal to the difference between its associated input signal and the highest one of all the signals carried by the conductors.

The present invention thus provides a circuit arrangement of the type mentioned in the introductory paragraphs which meets the above-mentioned requirements in that it permits the levels of the maximum voltages applied to the lines to be assigned a controllable switching threshold and simultaneously provides a second controllable switching threshold which assures that a voltage differential between the highest and the second-highest voltage is maintained. This is accomplished, according to the present invention, in that the lines are connected to the inputs of amplifiers whose outputs are combined in a known circuit to determine the maximum value (e.g. a diode OR) which has a common output, that from this common output to the input of each amplifier a first feedback branch having a coupling factor is provided, that a second feedback branch preferably having the same coupling factor is connected from the output of each amplifier to its input and that a switch is provided in the second feedback branch in such a manner that when the switch is closed there always is a potential at the amplifier output which is approximately proportional to the difference between the input voltage of the respective amplifier and the highest input voltage at any one of the amplifiers.

BRIEF DESCRIPTION OF THE DRAWINGS

FIG. 2a is a diagram of a circuit constituting one embodiment of the present invention forming part of an evaluation device.

FIG. 2b is a circuit diagram of an equivalent circuit of one element of the circuit of FIG. 2a.

FIG. 2c is a circuit diagram of another embodiment of such an element.

DESCRIPTION OF THE PREFERRED EMBODIMENTS

Figures 1A, 1B:
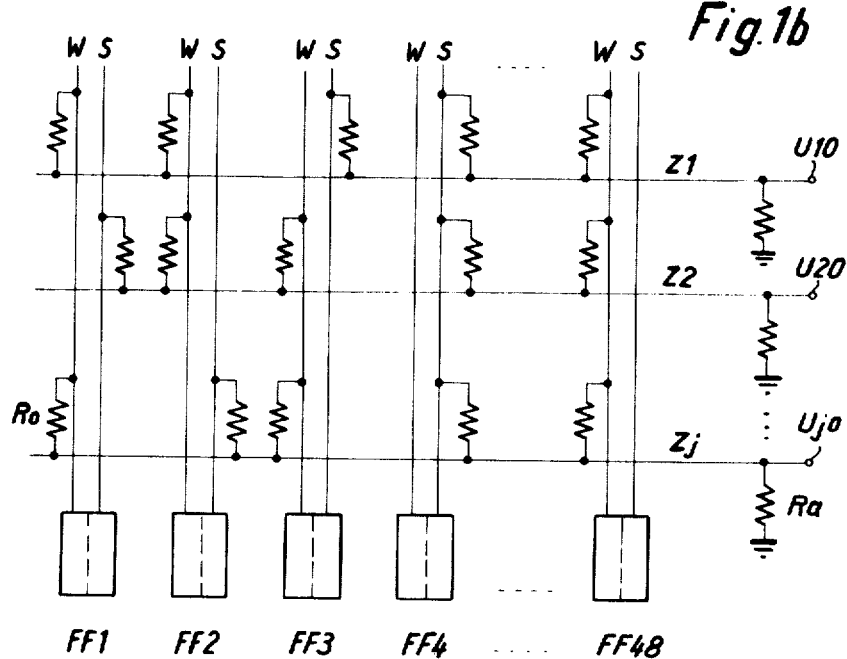
FIG. 1a is a representation of a character used in explaining the selection criteria of the reader and the creation of the signal voltages.
FIG. 1b is a circuit diagram of a matrix for deriving the various signal voltages.

FIG. 1a is a schematic representation of a rectangular scanning field which is subdivided into 6 × 8 picture elements. The photoelectric cells scanning the character are distributed over the scanning field in the pattern of the picture elements. A character, here the letter "R," appearing in the scanning field would thus, for example, make the picture elements marked with crosses appear black and would cause each of the corresponding photoelectric cells to emit a signal.

In the resistor matrix of FIG. 1b, a respective one of the bistable flip-flops FF1 to FF48 is associated with each photoelectric cell. A line W and a further line S for the negated signal of the line W are connected to each of the flip-flops. This total of 48 pairs of lines W, S form the 48 columns of the matrix. The number of rows in the matrix is equal to the number $j$ of the characters to be stored in the matrix.

The row lines Z1 to Z$j$ leading from the matrix are each connected to ground via a resistor R$a$. The points of intersection of the matrix are indicated by resistors R$o$ each of which connects its row line with either the W-line or the S-line of an associated flip-flop FF1 to FF48. If a given resistor is connected to the column line W, this means that the corresponding picture element in the scanning field of FIG. 1a will be black when the scanned character corresponds to the nominal character represented by the matrix row with which that resistor is associated. Conversely, the connection, via a resistor R$o$, of the row line with a column line S indicates that this particular picture element will not include a portion of a character corresponding to the nominal character of the associated matrix row, i.e. the picture element will be white.

Let it be assumed that a character presently in the scanning field exactly corresponds to a stored nominal character. During evaluation, or sensing, those flip-flops FF1 to FF48 corresponding to the picture elements in which portions of the character appear are set to state "1," whereas the other flip-flops remain in state "0." It follows from the above assumption, that every intersection point of one specific row line will be connected, via resistors R$o$, to that output W or S of each flip-flop which is at a greater potential. Thus, in the one row line corresponding to the recognized character a current flows from each flip-flop via a resistor R$o$ and is conducted to ground via the appropriate resistor R$a$. Therefore, a total of 48 partial, equal amplitude currents are summed in the resistor R$a$ so that the voltage drop appearing thereacross is greater than that of the corresponding resistors of the other row lines.

At least some of the other row lines generally also produce partial currents whose amplitudes correspond to the number of their resistors R$o$ which are at the higher potential. However, the current sum in each of these other row lines is not high enough to produce a similar signal at its corresponding resistor R$a$.

In practice, however, it can not be assumed that a character to be read will create a pattern which corresponds exactly with the pattern which its associated row line is constructed to match. It can rather only be demanded that the actual character coincide with its preset pattern at a certain minimum number of picture elements.

The above-described method of character reading is known. The further processing of the matrix output signals, up to identification of the characters, can be accomplished with the aid of a circuit arrangement according to the invention, which will be explained in detail with reference to FIG. 2a.

The row line Z1 (FIG. 1b) associated with a certain nominal character is connected, as shown in FIG. 2a, to the input of an associated linear amplifier V1 to apply an input voltage U10 thereto. The output U12 of this amplifier is connected to ground via the series connection of a diode D12 and a voltage divider consisting of resistors R14 and R12. The output of the voltage divider, appearing at the junction between resistors R12 and R14, is applied to an inverted input $i$ of amplifier V1 so that the output signal U12 is returned to its input in the form of a negative feedback. The amplifier output is further connected, via a series connection of a further diode D11, which is poled in the opposite direction from diode D12, and a resistor R13, to the inverted input $i$. The resistor R13 has the same resistance value as resistor R14, and a differential signal $d1$ can be derived from the connection point between diode D11 and resistor R13.

One such feedback amplifier circuit is associated with each character row 1 to $j$ of the matrix, the connection points of the diodes D$n$2 with the resistors R$n$4 being combined at a star point SP which is connected to ground via a resistor R3. The symbol $n$ indicates any character row and can have a value of between 1 and $j$.

Let it be assumed that the voltage U10 at amplifier V1 is more positive than the input voltages to the remaining amplifiers. As a result, the output voltage U12 also becomes positive with respect to point SP and the feedback branch D12, R14 becomes active. The amplification of the feedback amplifier V1 then is:

$$(U12/U10) = (V/1+\alpha V)$$

where $$\alpha = (R12/R12+R14) = (R12/R12+R13)$$

and $V$ is the amplification factor of the amplifier itself.

Making the assumption that $\alpha V \gg 1$, the amplification equation reduces to:

$$(U12/U10) = (1/\alpha)$$

The output voltages of the remaining amplifiers, e.g. U22, are more negative than U12 and thus their diodes D$n$2, e.g. diode D22, are reverse biased, and hence blocked. From the star point SP, however, the output voltage U12 becomes effective, via the voltage divider R24, R22, for example, to apply a voltage $\alpha$U12 at the inverted input $i$ of V2. Diode D21 is biased in its forward direction and a current now flows from star point SP through resistor R24 and resistor R22. Moreover, a current flows through R22 via D21 and R23 so that the voltage at R22 is proportional to the sum of U12 and U22.

FIG. 2b illustrates these relationships. The output voltage U22 is applied in negated form to the amplifier input via a voltage divider having the reduction ratio $\alpha$. At the same time, the output voltage U12 of amplifier V1 also becomes effective in negated form via a further voltage divider $\alpha$. Again assuming that $\alpha V \gg 1$ the following relationships exist:

$$[U20 - (U22 \cdot \alpha + U12 \cdot \alpha)] \cdot V = U22$$

$$U22(1 + V \cdot V) = U20 \cdot V - U10 \cdot V$$

$$U22 = \frac{V \cdot (U20 - U10)}{1 + V \cdot \alpha} \approx \frac{U10 - U20}{\alpha}$$

These equations show that the output voltage U22 is directly proportional to the difference between the input voltage U20 and the maximum input voltage (i.e. U10). Since it has been assumed that U10 in this case is higher than U20, it is obvious that U22 must have a negative value. Thus, a negative potential is always present on each of the remaining lines $dn$, which voltage is directly proportional to the voltage difference between the corresponding input signal and the highest applied input signal. These difference signals are each fed to the information input of a respective threshold value circuit S1 to S$j$ having an adjustable switching threshold. The control inputs of these threshold value circuits are connected together and a control voltage $U_d$, by which all of the switching thresholds can be uniformly established, is applied thereto. The star point SP is connected to the input of a further threshold value circuit $S_x$ whose threshold level is controlled by a signal $U_r$.

The output signals of the threshold value circuits S1 to S$j$ are combined in a doublecheck circuit DP which determines whether the information input voltages of more than one of the threshold value circuits have exceeded their switching threshold. If this occurs, the doublecheck circuit DP emits an output signal.

The control voltage $U_d$ for the threshold value circuits S1 to S$j$ always has a negative value and each threshold value circuit emits an output signal whenever its associated information signal $dn$ is more positive than $U_d$. The voltage on that line $dn$ (e.g. $d1$) which is associated with the highest input voltage (e.g. U10) will invariably be positive, and hence more positive than $U_d$. If, however, voltage U20 is not substantially lower than U10, i.e. if the character being read does not differ from the nominal character of matrix line Z2 more substantially than from the nominal character of line Z1, the voltage $d2$ will have only a very small negative value. If it is more positive than the negative voltage $U_d$, the threshold value circuit S2 will, in addition to the threshold value circuit S1, emit an output signal.

The doublecheck circuit DP is constructed to recognize that more than one threshold value detector has responded and thus sends an output signal to the negating input of an AND-NOT logic gate T1 (output = 1 when $S_xDP$ is true). This signal leads, in a manner to be further explained below, to the production of a rejection signal.

In the identification of characters in the above-described manner it is generally not sufficient to evaluate a character only from the standpoint of whether it is more like one nominal character than all the other nominal characters. Rather, an absolute minimum of coincidence with a particular nominal character must be detected. To this end, the voltage at the star point SP, which is proportional to the highest of the amplifier input voltages U10 to U$j$0, is examined in the threshold value detector $S_x$ to produce an indication of whether it exceeds the threshold voltage $U_r$. If it does, the threshold value detector $S_x$ emits a signal to the AND-input of gate T1. Thus, the required measure of minimum coincidence can be established with the aid of the threshold value $U_r$.

At the output of the gate T1 a signal appears only if the doublecheck circuit DP does not furnish an output signal and if at the same time the appearance of a logic "one" at the output of the threshold value detector $S_x$ indicates that the highest received voltage U$n$0 exceeds the required minimum value.

The output of the gate T1 is connected to the negating input of a rejection AND-gate GR and with an input of an AND-gate GF. Both gates are enabled at certain evaluation instants by a timing signal applied to their other inputs. If the doublecheck in circuit DP has indicated that a plurality of threshold value circuits S1 to S$j$ have responded, or if the highest appearing input voltage does not reach the required minimum value, the output of gate T1 will not furnish a signal (i.e. will furnish a logic 0) and, upon occurrence of the timing signal, the rejection of the character is effected by an output signal from gate GR.

If all of the requirements for a correct character identification are met, T1 emits a logic 1, causing gate GF to emit a signal upon the occurrence of a timing signal, and gates G1 to G$j$, all controlled by the AND-gate GF and connected to the outputs of the threshold value circuits, transmit the respective states of the threshold value circuits. Since the doublecheck operation assures that only a single threshold value circuit emits an output signal, the output of only one gate G1 to G$j$ will be activated.

The circuit arrangement according to the present invention is not limited to use with the above-described character reader. It can also be advantageously employed in any other system where it is desired to determine simultaneously the highest voltage of a plurality of applied voltages and the difference between this highest voltage and each of the other voltages. In these cases it would be particularly advantageous if both values (maximum voltage and difference) be reproduced with the same amplification factor ($1/\alpha$).

The present invention is also not limited to the type of feedback employed in the preferred embodiment. While a voltage feedback has been described, in many cases it is also advantageous to use a current feedback. An analogous circuit for this purpose is shown in FIG. 2c. At the output of an amplifier V, diodes D1 and D2 are connected oppositely poled to that shown in FIG. 2a, diode D2 being connected to a star point SP. Diode D1 is connected, via a resistor R30, to the inverting amplifier input which is also connected, via a further resistor R4, to the star point SP. A series resistor R$s$ is connected in the input line U0 of amplifier V and the output signal $d$ is derived from the connection point between resistor R30 and diode D1.

In this circuit an amplifier with only one input is required since the subtraction of the feedback signal from the input signal U$o$ is accomplished automatically across the resistor R$s$. If the diode D2 is conductive, the amplifier output signal acts as a feedback on the amplifier input in the form of a current flowing via D2 and R4 and the amplifier input to ground. In the opposite case, when D2 is blocking and D1 is conductive, the signal from the amplifier output via D1 and R30 and the signal from the star point SP act on the amplifier input so that the relationships derived with reference to FIG. 2a also apply for this circuit.

It will be understood that the above description of the present invention is susceptible to various modifications, changes and adaptations.

I claim:

1. In a system including a plurality of conductors each carrying a respective signal, a circuit for providing an indication of which conductor is presently carrying that signal whose amplitude is the highest of all the signals, said circuit comprising, in combination:
   a. a plurality of amplifiers, one for each conductor, each having an input connected to a respective conductor;
   b. maximum signal value receiving means connected to the outputs of all of said amplifiers and having a common output at which appears a signal corresponding to the highest of the output signals of all of said amplifiers;
   c. feedback means connected between said common output and each said amplifier for applying to each said amplifier an inverted input whose amplitude is a predetermined fraction of the common output signal; and
   d. a plurality of second feedback means, each including a switch element and each connected between the output and the input of a respective amplifier, each said switch element being operative for feeding a predetermined fraction of its amplifier output back to its input only when the output from its respective amplifier is less than the highest of all the amplifier outputs so as to cause the output from each such amplifier to produce an output signal which is approximately equal to the difference between its associated input signal and the highest one of all the signals carried by said conductors.

2. An arrangement as defined in claim 1 wherein said maximum signal value receiving means comprise a plurality of diodes, one for each said amplifier, each connected between the output of a respective amplifier and said common output and poled to have a forward conduction direction from its respective amplifier output to said common output, each said switch element is constituted by a second diode having one end connected to the output of its respective amplifier and poled to have a forward conduction direction toward said amplifier output, and each said second feedback means further includes voltage divider means connected between said common output and the other end of its respective second diode, whereby the output signal from each amplifier appears at said other end of said second diode.

3. An arrangement as defined in claim 2 further comprising a plurality of threshold value circuits, one for each said amplifier, each having an information input connected to said other end of the second diode associated with its respective amplifier and a threshold value input for receiving a signal which determines the level which its information input signal must have in order for said threshold value circuit to produce an output signal, and threshold value means connected to the threshold inputs of all of said threshold value circuits for applying the same threshold value signal to all of said threshold inputs.

4. An arrangement as defined in claim 3 further comprising a doublecheck circuit having a plurality of inputs each connected to the output of a respective one of said threshold value circuits and an output which produces a signal whenever more than one of said threshold value circuits emits an output signal.

5. An arrangement as defined in claim 4 further comprising an additional threshold value circuit having an information input connected to said common output and a threshold value input for providing a threshold value signal which determines the level which the signal at its information input must have in order for said additional threshold value circuit to emit an output signal.

6. An arrangement as defined in claim 5 further comprising reject means connected to the output of said doublecheck circuit and the output of said additional threshold value circuit for emitting a reject signal whenever said doublecheck circuit emits a signal or said additional threshold value circuit does not emit a signal.

7. An arrangement as defined in claim 2 wherein said feedback means includes a plurality of first impedance elements, one for each said amplifier, each connected between said common output and its respective amplifier, and said voltage divider means associated with each said amplifier includes a second impedance element having the same impedance as said first impedance element and connected between said other end of said second diode of its associated second feedback means and said amplifier input, and a third impedance element associated with each said amplifier and connected between said amplifier input and ground to form a voltage divider with each of said first and second impedance elements associated with the same amplifier.

8. An arrangement as defined in claim 1 further comprising an additional threshold value circuit having an information input connected to said common output and a threshold value input for providing a threshold signal whose value determines the level which said information signal must have in order to cause said additional threshold value circuit to produce an output.

9. An arrangement as defined in claim 1 in combination with a character-reading device for identifying each character read.

10. In a system including a plurality of conductors each carrying a respective signal, a circuit for providing an indication of which conductor is presently carrying that signal whose amplitude is the highest of all the signals, said circuit comprising in combination:
  a. a plurality of amplifiers, one for each conductor, each having an input connected to a respective conductor;
  b. maximum signal value receiving means connected to the outputs of all of said amplifiers and having a common output at which appears a signal corresponding to the highest of the output signals of all of said amplifiers;
  c. first feedback means connected between said common output and the input of each of said amplifiers for continuously applying to each said amplifier an inverted input signal whose amplitude is a predetermined fraction of the signal appearing at said common output;
  d. a plurality of second feedback means, each of said second feedback means being connected between the output and the input of a respective amplifier and including a switching means, for selectively applying an inverted input signal, whose amplitude is a predetermined fraction of the output signal of the respective amplifier, to the input of the respective amplifier only if the output signal thereof is not said highest output signal of all of said amplifiers, so that the total feedback signal applied to the input of the amplifier having the highest output signal has an amplitude which is a predetermined fraction of said signal at the common output and the feedback signal applied to the input of each of the other amplifiers have an amplitude which is equal to the sum of the feedback signal which is a predetermined fraction of the signal at said common output and the feedback signal which is a predetermined fraction of the respective amplifier output; and
  e. means connected to the output of each of said amplifiers for providing an output signal from the one of said amplifiers which has the highest input signal which is substantially equal to the output signal thereof, and for providing an output signal from each of the other of said amplifiers which is approximately equal to the difference between its associated input signal and the highest input signal.

11. The arrangement as defined in claim 10 wherein said first feedback means and each of said plurality of second feedback means are connected to form a like plurality of signal summing circuits, the outputs of which are connected to the inputs of the respective amplifiers.